(12) United States Patent
Lotze (10) Patent No.: US 6,854,193 B2
(45) Date of Patent: Feb. 15, 2005

(54) ROTATING SWIVEL UNIT FOR SENSORS OF A COORDINATE MEASURING APPARATUS AND METHOD FOR DETERMINING CORRECTIVE PARAMETERS OF THE ROTATING SWIVEL UNIT

(75) Inventor: Werner Lotze, Dresden (DE)

(73) Assignee: Carl-Zeiss-Stiftung, Heidenheim (DE)

( * ) Notice: Subject to any disclaimer, the term of this patent is extended or adjusted under 35 U.S.C. 154(b) by 0 days.

(21) Appl. No.: 10/400,799

(22) Filed: Mar. 28, 2003

(65) Prior Publication Data

US 2003/0233760 A1 Dec. 25, 2003

Related U.S. Application Data

(63) Continuation of application No. PCT/EP01/10066, filed on Aug. 31, 2001.

(30) Foreign Application Priority Data

Sep. 28, 2000 (DE) .......................................... 100 48 096
Sep. 28, 2000 (DE) .......................................... 100 48 095

(51) Int. Cl.[7] .............................................. G01B 7/008
(52) U.S. Cl. .......................................... 33/502; 33/503
(58) Field of Search ......................... 33/502–504, 556, 33/1 M (56) References Cited

U.S. PATENT DOCUMENTS

| 4,819,339 A | * | 4/1989 | Kunzmann et al. ........... 33/503 |
| 4,888,877 A | | 12/1989 | Enderle et al. |
| 5,778,548 A | | 7/1998 | Cerruti |
| 6,628,322 B1 | * | 9/2003 | Cerruti ....................... 348/141 |

FOREIGN PATENT DOCUMENTS

WO    WO 02/27268 A1 * 4/2002

* cited by examiner

Primary Examiner—Christopher W. Fulton
Assistant Examiner—Tania Courson
(74) Attorney, Agent, or Firm—Walter Ottesen (57) ABSTRACT

The invention relates to the determination of correction parameters of a rotating swivel unit. An optical sensor (9) measuring in at least one dimension is fixed to the unit. The sensor is calibrated on a calibration body in at least three rotational positions of a rotating joint of the rotating swivel unit. At least parameters of a first parameter field are calculated, the field describing the transformation (rotation) of a sensor coordinate system (u,v,w) in the machine coordinate system ($X_M$, $Y_M$, $Z_M$), and parameters of another parameter field are determined, the other field describing the shift (vector) of the sensor coordinate system in relation to the point (AB) (in the measuring arm) in the machine coordinate system.

19 Claims, 5 Drawing Sheets

ROTATING SWIVEL UNIT FOR SENSORS OF A COORDINATE MEASURING APPARATUS AND METHOD FOR DETERMINING CORRECTIVE PARAMETERS OF THE ROTATING SWIVEL UNIT

RELATED APPLICATIONS

This application is a continuation application of international patent application PCT/EP 01/10066, filed Aug. 31, 2001, and claiming priority from German patent application 100 48 095.0, filed Sep. 28, 2000, and 100 48 096.9, filed Sep. 28, 2000.

FIELD OF THE INVENTION

The invention relates to a method for determining corrective parameters of a rotating swivel unit as well as a rotating swivel unit for sensors of a coordinate measuring apparatus having at least two swivel joints.

BACKGROUND OF THE INVENTION

A method of the above kind is described in U.S. Pat. No. 4,888,877. Here, a rotating swivel unit is described having two motorically-displaceable swivel joints with corresponding angle encoders whose respective rotational axes are perpendicular to each other. The swivel joints of the rotating swivel unit exhibit a reproducible running performance. Corrective values are determined in order to be able to bring the swivel joints of the rotating swivel unit into desired rotational positions without it being necessary to calibrate the sensors anew. The corrective values describe angle position deviations and/or the position of the rotational axes to each other and/or course deviations of the rotational axes. To determine the axis position, it is herein suggested, inter alia, to attach a probe head to the rotating swivel unit which is aligned inclined in space and to move this probe pin about each one of the rotational axes in a plurality of angular positions and to measure the probe ball attached hereto in the particular angular position. The position of the rotational axis results then as a normal to a circular plane through the center point of the circle. The circular plane is adapted in the best possible manner to the measuring points. Furthermore, and as explained above, angular position deviations and/or course deviations of the rotational axes can be corrected. To record the corresponding corrective values, it is suggested to attach plates with four balls to the rotating swivel unit and to measure the center points of the balls for a plurality of rotational positions. From the measured center points of the balls, corresponding corrective values can be determined for each rotational position and these corrective values can then be applied additionally for correction.

What is important in this method is that, to record the corrective values, the spatially-inclined probe ball as well as the plates with the four balls have to be attached to the rotating swivel unit and to record the measurement values, the rotating swivel unit has to be attached to a coordinate measuring apparatus which then records the measured values for determining the corrective parameters.

U.S. Pat. No. 5,778,548 discloses a method of calibrating an optical sensor. The optical sensor is connected via a rotating swivel unit to the measuring arm of the coordinate measuring apparatus via which the sensor can be rotated in two mutually perpendicular rotational axes. The sensor itself includes an illumination unit which projects a laser beam in a line-shaped fanned pattern onto a workpiece to be measured as well as a video camera which evaluates the line-shaped pattern in accordance with the laser triangulation principle.

So that the measured values, which are recorded by the video camera, can be transformed into the machine coordinate system, a rotation matrix is determined, which describes the rotation of the sensor coordinate system in the machine coordinate system, and a vector is determined which describes the offset of the origin of the sensor coordinate system relative to an attachment point of the rotating swivel unit known in the machine coordinate system. Every point measured by the optical sensor can then be transformed into the machine coordinate system via the rotation matrix and the offset vector.

To determine the rotation matrix and the position vector, a cube-shaped test body is provided which had been measured previously into the machine coordinate system via a mechanical probe head. The test body has a bore centrally on the surfaces to be scanned. The Z-axis is defined in the optical sensor arbitrarily as the optical axis of the video camera. The optical sensor is moved approximately along this Z-axis in order to determine the alignment of the Z-axis of the sensor coordinate system. The optical sensor is moved such that it always brings the bore into the center of the image in the different positions. One proceeds in the same manner for the Y-axis of the sensor coordinate system. In this way, the alignment of the Z-axis and the Y-axis and therefore also the X-axis is precisely defined and the parameters of the rotation matrix for rotating the sensor coordinate system in the machine coordinate system and the parameters of the vector, which defines the position of the origin of the sensor coordinate system relative to the point in the machine coordinate system, can be computed.

SUMMARY OF THE INVENTION

It is an object of the invention to proceed from the above and provide a method with which corrective parameters of a rotating swivel unit can be determined. It is also an object to provide a corresponding coordinate measuring apparatus.

The method of the invention is for determining corrective parameters of a rotating swivel unit to which a sensor of a coordinating measuring apparatus is attached with the sensor measuring in at least one dimension. The rotating swivel unit has a swivel joint and the method includes the steps of: carrying out a calibration of the sensor for at least three rotational positions of the swivel joint; computing at least parameters of a first parameter field ($M_S$) for each of the rotational positions with the first parameter field ($M_S$) describing the transformation of a sensor coordinate system (u,v,w) into a machine coordinate system ($X_M$, $Y_M$, $Z_M$) of the coordinate measuring apparatus; computing parameters of a second parameter field ($d_S$) describing an offset of the sensor coordinate system (u,v,w) with respect to a point (AB) in the machine coordinate system ($X_M$, $Y_M$, $Z_M$); and, determining corrective parameters of the swivel joint from the parameters of the first and second parameter fields.

A special feature of this method is that a sensor, which measures in at least one dimension, is attached to the rotating swivel unit for recording the corrective values. A calibration of the sensor on a calibration body is carried out for at least three rotational positions of the swivel joint. In this calibration, at least parameters of a first parameter field which describes the transformation of a sensor coordinate system into the machine coordinate system are computed and parameters of a further parameter field which describes the offset of the sensor coordinate system relative to a point in the machine coordinate system are computed. Parameters of corrective parameter fields of the swivel joint are then derived from these determined parameters.

In this way, the special advantage is afforded that at the swivel joint for which the corrective parameters are recorded, an ancillary device does no longer have to be attached; rather, the sensor for recording the corrective values can be used directly. The ancillary device described above is the spatially inclined directed ball and/or the plate having the four balls attached thereto. Furthermore, the rotating swivel unit no longer has to be separately mounted on a coordinate measuring apparatus as a workpiece and measured for recording the corrective values. Rather, the rotating swivel unit can be attached directly to the measuring arm of the coordinate measuring apparatus and record the corrective values in this position.

As a sensor, any sensor, which measures in at least one dimension, can be used. For example, a contact-working measuring probe head can be used which measures the deflection of a probe pin relative to the probe head in the three coordinate directions via corresponding displacement sensors. An optical triangulation probe, which measures in one or two dimensions, can also be used.

The rotating swivel unit can be configured in various ways. The rotation swivel unit can be a rotation swivel unit having continuously adjustable swivel joints with which any desired rotational angle can be adjusted as described in U.S. Pat. No. 4,888,877 incorporated herein by reference. It is also possible to use a so-called latching rotating swivel unit with which diverse, fixedly predefined latch positions can be assumed with the swivel joints.

The corrective parameters can include the position of the rotational axes to each other and/or angular position deviations and/or course deviations of the rotational axes.

In order to have the least possible error influences in the calibration, the rotational axis of that swivel joint, for which the corrective parameters are recorded, should be aligned vertically during the calibration so that this swivel joint bends as little as possible.

In order to hold the measurement errors as small as possible, measured values should be used in the calibration which are uniformly distributed over the entire measuring range of the sensor.

The method can be carried out especially suitably for the swivel joint to which the sensor is directly attached. However, all other swivel joints of the rotating swivel unit can be correspondingly corrected.

The corrective unit, which is assigned to the rotating swivel unit and in which the measured values are corrected in correspondence to the position of the swivel joints, is the control and evaluation unit of the coordinate measuring apparatus with which the measuring sequences are controlled and the measuring data are evaluated. This control and evaluation unit usually includes an evaluation computer which is connected via a bus to a control of the coordinate measuring apparatus. In recent times, there are also control and evaluation units wherein the control is integrated into the evaluation computer. This control has to interact substantially in real time with the drives and the measured value pickups of the coordinate measuring apparatus.

The first parameter field shows the transformation of the sensor coordinate system into the machine coordinate system and is, as a rule, a three-line matrix which is also characterized as a sensor matrix. The number of the required columns varies with the number of dimensions which can be measured with the sensor.

The second parameter field describes the offset of the sensor coordinate system (u, v, w) relative to a point (AB) in the machine coordinate system $(X_M, Y_M, Z_M)$. This parameter field is a vector. The point (AB) must be a known point in the machine coordinate system $(X_M, Y_M, Z_M)$ with respect to which the origin of the sensor coordinate system (u, v, w) has a fixed spatial position. This point therefore has to be defined somewhere in the measuring arm to which the sensor is attached. The point (AB) changes its position relative to the origin of the machine coordinate system when the mechanic of the coordinate measuring system is shifted in the three coordinate directions. The so-called built-in position of a rotating swivel unit can be used, for example, as a suitable point and this built-in position defines the position of the rotational axis of the swivel joint lying closest to the measuring arm. However, any desired other point can be defined in the measuring arm.

The determination of these parameters could either be carried out as described in U.S. Pat. No. 5,778,548 incorporated herein by reference or especially advantageously as described hereinafter with respect to the drawings.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
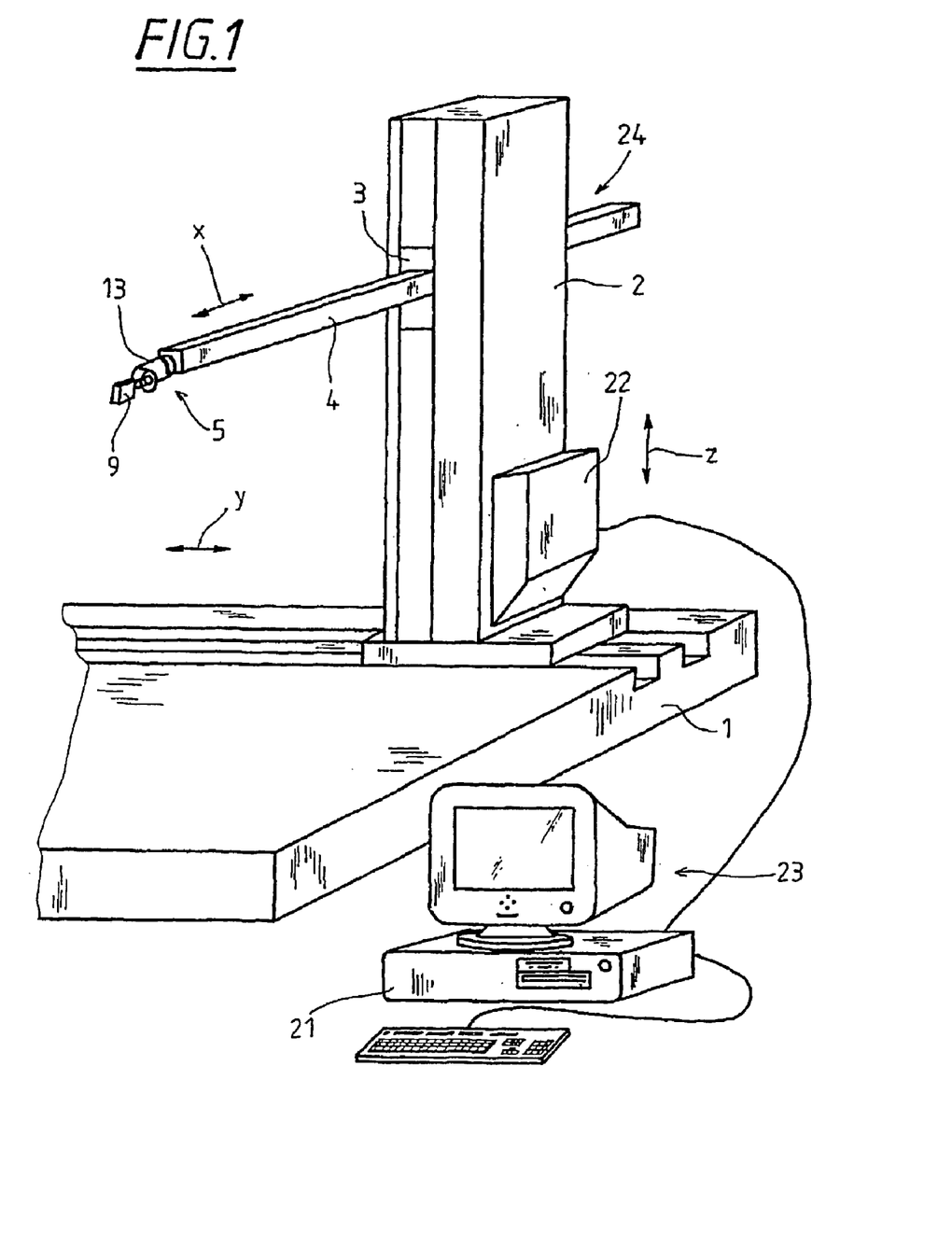
FIG. 1 is a schematic perspective of a coordinate measuring apparatus having an optical two-dimensionally measuring sensor 9 which is attached to the measuring arm 4 of the coordinate measuring apparatus via a rotating swivel unit 13 having three swivel joints.

FIG. 1 shows a coordinate measuring apparatus mounted on a stand in a perspective view with a sensor arrangement 5 which includes an optical two-dimensionally measuring sensor 9 as well as a rotating swivel unit 13 having three swivel joints (6, 7, 8) which will be explained in greater detail hereinafter with respect to FIGS. 2 and 3.

The coordinate measuring apparatus includes a mechanic 24 via which the sensor assembly is shifted in the coordinate directions (X, Y, Z). This mechanic 24 includes a stand 2 which can be moved on the measuring table 1 on guides in the direction identified by arrow (y). A cross slide 3 is displaceably mounted on the stand 2 and can be moved in the direction identified by the arrow (z). The measuring arm 4 is, in turn, displaceably journalled on the cross slide 3 for movement in the direction of arrow (x).

Scales with corresponding read-out heads are assigned to the individual guides so that the particular position of the sensor assembly 5 can be determined in all three coordinate directions (X, Y, Z). Furthermore, drives are provided via which the stand 2, the cross slide 3 and the measuring arm 4 can be moved in the coordinate directions (X, Y, Z). As a control and evaluation unit, the coordinate measuring apparatus here includes, by way of example, an evaluation computer 21 and a control 22. The evaluation computer 21 functions to establish measuring sequences and to evaluate the measuring data and the control 22 functions to drive the drives and to record the measurement data. The evaluation computer 21 and the control 22 of the control and evaluation unit 23 are connected to each other via a bus. All methods described hereinafter are carried out in the control and evaluation unit 23.

Measuring points on a workpiece (not shown in FIG. 1) can be recorded with the sensor assembly 5 as will be described in greater detail hereinafter with respect to FIG. 2. FIG. 2 likewise shows a perspective view of the sensor assembly 5. As can be seen in FIG. 2, the sensor 9 is attached to the measuring arm 4 of the coordinate measuring apparatus via a rotating swivel unit 13. The rotating swivel unit 13 includes three swivel joints (6, 7, 8) which define respective rotational axes ($a_a$, $a_b$, $a_c$). The rotational axis $a_b$ of the swivel joint 7 is perpendicular to the rotational axis $a_a$ of the swivel joint 6 and the rotational axis $a_c$ of the swivel joint 8 is, in turn, perpendicular to the rotational axis $a_b$ of the swivel joint 7. In this way, the sensor 9 can be shifted as desired in space. The rotating swivel unit 13, which is used in this embodiment, is actually a rotating swivel unit having only two swivel joints (6, 7) as shown in U.S. Pat. No. 4,888,877 which is incorporated herein by reference. The third swivel joint 8 having the optical sensor 9 is accommodated via the probe head exchange device located hereon. The configuration of the swivel joint 8 is completely like the configuration of the corresponding swivel joints (6, 7). This has a special advantage. Rotating swivel units having two swivel joints are well known in present day coordinate measuring apparatus. Therefore, it serves little purpose to additionally provide a rotating swivel unit having three swivel joints because this causes unnecessary cost. On the one hand, a rotating swivel unit having three swivel joints would have to be additionally manufactured. On the other hand, the corrective values, which are described in U.S. Pat. No. 4,888,877, would have to be recorded for each of the three swivel joints insofar as they are present.

The rotating swivel unit 13 can, however, also be a unit which includes three swivel joints (6, 7, 8) when this is wanted. Furthermore, the rotating swivel unit can also be a latching rotating swivel unit wherein various rotation positions are formed as detents.

The optical sensor 9 will be described with reference to FIGS. 2 and 3. FIG. 3 shows a schematic of sensor 9 in a side elevation view. In this embodiment, the sensor 9 is configured as a two-dimensionally operating optical laser triangulation probe. For this purpose, the sensor 9 has an illumination unit 14 which fans out a laser beam into a light fan 10 as shown in FIG. 2, The illumination unit 14 can include a laser as well as a rotating mirror prism which fans out the laser beam linearly into a light fan 10. When the light fan 10 impinges on the surface of the workpiece (here, a calibration sphere 12) and is reflected from this surface, a line-shaped pattern 11 results as shown in FIG. 2. This line-shaped pattern 11 is viewed by a video camera and in such a manner that the optical axis 17 of the video camera defines an angle with the light fan 10. In FIG. 2 only the objective 15 and the CCD chip 16 of the video camera are shown schematically. From the recorded image of the line-shaped pattern 11, the distance from the workpiece (here, the calibration sphere 12) can be computed for all measuring points along the line-shaped pattern 11. The measuring range of the optical sensor is limited by the viewing field of the video camera and this measuring region is configured as a two-dimensional measuring field 20 for this specific measuring sensor.

The optical sensor 9 has to be incorporated into the coordinate measuring apparatus utilizing computation means so that the sensor supplies the determination of spatial points and form elements for the features to be measured on a workpiece independently of the position and orientation of the sensor.

This is achieved in that the sensor signals, which are determined in the sensor coordinate system (u,v,w), are converted and transformed with the aid of multi-parameter equations into the machine coordinate system ($X_M$, $Y_M$, $Z_M$) of the coordinate measuring apparatus.

Figure 4:
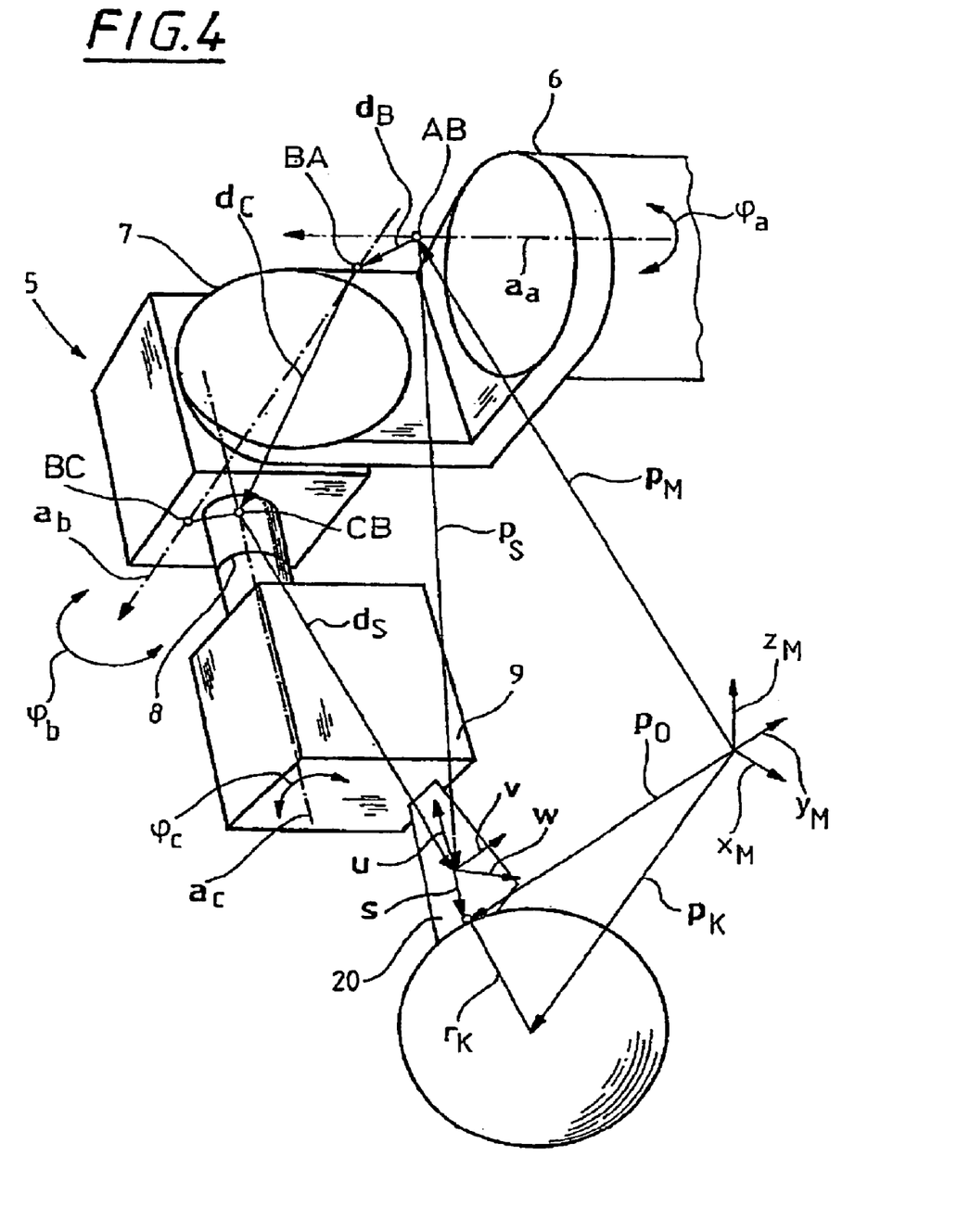
FIG. 4 is a perspective schematic showing the position of the sensor coordinate system (u, v, w) of the optical sensor 9; and, FIG. 5 is a schematic showing the method for recording the corrective values.

It is a condition precedent that the internal calibration of the sensor is sufficiently accurate and the sensor 9 supplies Cartesian sensor coordinates (s'={u,v,w}) for a workpiece to be measured as shown in FIG. 4.

FIG. 4 shows a schematic representation of the rotating swivel unit 13 and of the sensor 9 with respect to which the mathematical procedure will be explained. A sensor of this kind is, for example, available from the Perceptron Company. The position and the spatial orientation of the sensor are the basis for the external signal processing. Furthermore, it is also a precondition that an assembly calibration was already made for the rotating swivel unit having the two rotational axes ($a_a$ and $a_b$) as described in detail in U.S. Pat. No. 4,888,877 so that the positions of the points (AB and BA) are known in dependence upon the rotational position of the rotating swivel unit. The positions of the points (AB and BA) are each defined by the intercept point of the distance straight line (lying between the rotational axes ($a_a$ and $a_b$)) with the rotational axes ($a_a$ and $a_b$). One can present a position vector $p_o$ of a measuring point, which is measured on the workpiece surface, in the machine coordinate system ($X_M$, $Y_M$, $Z_M$) as a vector equation as follows:

$$p_o = p_M + p_S + M_S s' \qquad \text{Equation 1}$$

The vector $p_M$ defines the position vector at point AB in the machine coordinate system ($X_M$, $Y_M$, $Z_M$). The vector ($p_S$={$x_S$, $y_S$, $z_S$}) defines the vector between the point AB and the origin of the sensor coordinate system (u,v,w). The vector s' is a measured value on the surface of the workpiece, which is to be measured, in the sensor coordinate system (u,v,w). The following:

$$M_s = \begin{pmatrix} m_{11} & m_{12} & m_{13} \\ m_{21} & m_{22} & m_{23} \\ m_{31} & m_{32} & m_{33} \end{pmatrix}$$

in turn characterizes a sensor matrix which defines the transformation of the sensor coordinate system (u,v,w) into the machine coordinate system ($X_M$, $Y_M$, $Z_M$). Since the sensor 9 measures only two dimensionally and therefore has only two sensor coordinates (u,v), the measuring region reduces to a flat measuring field 20 which, in the ideal case, is a plane. The sensor matrix $M_S$ then reduces itself as follows:

$$M_s = \begin{pmatrix} m_{11} & m_{12} \\ m_{21} & m_{22} \\ m_{31} & m_{32} \end{pmatrix}.$$

So that the position vector $p_o$ of the point measured on the workpiece surface can be computed via the equation 1 from a sensor measuring value s' in the machine coordinate system, the three parameters ($x_S$, $y_S$, $z_S$) of the vector $p_S$ must be determined as well as the six parameters ($m_{11} \ldots m_{32}$) of the sensor matrix $M_S$. The sensor measuring value s' is measured in the sensor coordinate system and the above point is measured on the surface of the workpiece.

The determination of these nine parameters is described in the following. For this purpose, the calibration sphere 12 shown in FIG. 2 is used with a precisely known radius and a precisely known center point. The center point of the calibration sphere 12 is determined in that the calibration sphere 12 is attached to the measuring table 1 of the coordinate measuring apparatus shown in FIG. 1 and the sphere is scanned at a plurality of points with a probing measuring head. From these points, the exact center point of the calibration sphere 12 can then be determined whose position vector is identified by $p_K$ in the machine coordinate system.

To calibrate the optical sensor 9, the rotating swivel unit 13 with the optical sensor 9 is exchanged on the measuring arm 4 and the calibration sphere 12 is measured in a plurality of positions. For a desired measuring point $p_{o,i}$ (the index i stands for i=1 ... number of measuring points) of the optical sensor 9 on the surface of the calibration sphere 12 in the machine coordinate system, the following must apply:

$$|p_{o,i} - p_K| = r_K \qquad \text{Equation 2}$$

wherein $p_K$ stands for the center point of the calibration sphere 12 and $r_K$ for the radius of the calibration sphere 12. If one replaces $p_{o,i}$ by the expression in equation 1, then one arrives at the following expression:

$$|p_M + p_S + M_S s'_i - p_K| = r_K. \qquad \text{Equation 3}$$

The nine sought-after parameters can now be determined relatively simply for a fixed angular position of the swivel joints (6, 7, 8) in that the Gaussian equalization method of least error squares is applied. The error $f_i$ for a measured measuring point results as follows:

$$f_i = |p_{o,i} - p_K| - r_K = |p_M + p_S + M_S s'_i - p_K| - r_K. \qquad \text{Equation 4}$$

The condition of minimum least squares is as follows:

$$\sum_{i=1}^{n} f_i^2 = \sum_{i=1}^{n} (|p_M + p_S + M_S s'_i - p_K| - r_K)^2 = \text{Min.} \qquad \text{Equation 5}$$

If one now records a plurality of measuring points $s'_i$ distributed over the surface of the calibration sphere 12, then this condition equation can be solved in accordance with present day conventional iterative methods such as Newton Raphson. From this, the sought-after parameters for the sensor matrix $M_S$ and for the vector $p_S$ result so that desired measuring points s' of the optical sensor 9 can be transformed in the machine coordinate system via equation 1.

The determined parameters, however, apply only for a single position of the rotating swivel unit 13. However, as soon as only one of the swivel joints (6, 7, 8) of the rotating swivel unit 13 is shifted, then the above-mentioned calibration for the corresponding rotation position must be carried out anew. To solve this problem, the suggestion was already made in U.S. Pat. No. 4,888,877 for a rotating swivel unit having two mutually perpendicular rotational axes, to equip the rotating swivel unit with swivel joints which can assume reproducibly different rotational positions and to assign corrective values to the rotating swivel unit which define the position of the rotational axes to each other and/or the angular position deviations and/or course deviations of the axes to each other. After the corrective values have been recorded, each of the swivel joints can be brought into a desired position. The measured values of the sensor can be transformed correspondingly into the machine coordinate system via the corrective values for each rotational position of the swivel joints.

The method known from the above-mentioned patent can be expanded without difficulty for a third rotational axis, such as rotational axis $a_c$. For this purpose, only the position of the third rotational axis $a_c$ need be determined. The intercept points of the distance line between the rotational axes $a_b$ and $a_c$ with the rotational axes ($a_b$ and $a_c$) define the points BC and CB. For a rotating swivel unit 13 having substantially error-free swivel joints (for which the position of the rotational axes with respect to each other is corrected as a single error), the position vector $p_o$ of a measuring point on the workpiece surface is as follows:

$$p_s = p_M + \{T_A^{-1} R_A [T_{AB}^{-1} R_B (T_{BC}^{-1} R_C (d_S + M^*_S s') + d_c) + ] d_s\} \qquad \text{Equation 6}$$

wherein:

$T_A^{-1}$ is the inverted transformation matrix for transforming the coordinate system of the rotational axis $a_a$ into the machine coordinate system;

$R_A$ is the rotation matrix which describes the rotation of the swivel joint 6 about its rotational axis $a_a$;

$T_{AB}^{-1}$ is the inverted transformation matrix for transforming the coordinate system of the rotational axis $a_b$ into the coordinate system of the rotation axis $a_a$;

$R_B$ is the rotation matrix which describes the rotation of the swivel joint 7 about its rotational axis $a_b$;

$T_{BC}^{-1}$ is the inverted transformation matrix for transforming the coordinate system of the rotational axis $a_c$ into the coordinate system of the rotational axis $a_b$;

$R_C$ is the rotation matrix which describes the rotation of the swivel joint 8 about its rotational $a_c$;

$d_B$ is the distance vector from point AB to point BA;

$d_C$ is the distance vector from point BA to point CB;

$d_S$ is the distance vector from point CB to the origin of the sensor coordinate system (u,v,w);

$M_S^*$ is the sensor matrix in the coordinates of the rotational axis $a_c$; and, s' is the vector of a measuring point in the sensor coordinates (u,v,w).

In the case of substantially error free swivel joints, the movements of these joints are a pure rotation and the following equation applies for the rotational matrices ($R_A$, $R_B$, $R_C$) for the rotation about the Z-axis of the corresponding joint coordinate system:

$$R_A = R_B = R_C = \begin{pmatrix} \cos\phi & -\sin\phi & 0 \\ \sin\phi & \cos\phi & 0 \\ 0 & 0 & 1 \end{pmatrix} \qquad \text{Equation 7}$$

In this equation 7, ($\phi$) identifies the rotational angle about the particular swivel joint (6, 7, 8). For the rotational matrix $R_A$, it is the rotational angle $\phi_A$ of the swivel joint 6 and for the rotational matrix $R_B$, it is the rotation angle $\phi_B$ of the swivel joint 7 and for the rotational matrix $R_C$, it is the rotational angle $\phi_C$ of the swivel joint 8.

All additional vectors and matrices are unknown also in the case of an ideal swivel joint and have to be experimentally determined. The zero angles of the two angular measuring systems are additional unknowns. Accordingly, for the calibration of the rotating swivel unit, measurements for adequately independent condition equations are to be carried out. This is also then the case when the correction of the individual swivel joints is known.

This equation 6 corresponds substantially to the equation I of U.S. Pat. No. 4,888,877. This equation was additionally expanded by the term for the third rotational axis $a_c$ and the equation is only described somewhat differently mathematically.

In this equation 7 and in the embodiment described here, the matrices $T_A^{-1}$, $T_{AB}^{-1}$ and the vector $p_M$ and $d_b$ are known in addition to the already known matrices ($R_A$, $R_B$, $R_C$) because the corresponding corrective parameters were determined for the swivel joints 6 and 7 of the rotating swivel unit 13 as already explained above in accordance with the procedure of U.S. Pat. No. 4,888,877.

With the built-on swivel joint 8 and sensor 9, only the parameters of the matrices ($T_{BC}^{-1}$, $M_S^*$) and the vectors ($d_C$, $d_S$) as well as the zero angle of the swivel joint 8 must be determined. The following relationship is present between the matrix $M_S^*$ and the matrix $M_S$:

$$M_S = T_A^{-1} R_A^* T_M^{-1} R_C^* T_k^{-1} R_c^* M_S$$

It will now be explained in detail how these missing parameters will be taken up individually. Basically, there are two solutions. There is one solution in accordance with the method of least error squares of the deviations on the calibration sphere and a two-step solution with calibration of the sensor parameters (as described above) and the follow-up determination of all parameters for the swivel joint 8.

First the position of the rotational axis $a_c$ of the swivel joint 8 should be determined in order to take up the remaining necessary corrective values. When the position of the rotational axis $a_c$ is known, a distance line can be computed between the rotational axes ($a_b$, $a_c$). The intercept points of this distance line with the rotational axes ($a_b$, $a_c$) determine the points BC and CB. Beyond this, however, the vector $d_C$ is defined which results as a distance vector between the points BA and CB. When the vector $d_C$ is known, the remaining parameters of equation 6 can be determined by taking up a plurality of independent determination equations as is usual by means of a numerical method such as the method of least error squares according to Gauss.

The position of the rotational axis $a_c$ could be determined in the same way as described in U.S. Pat. No. 4,888,877 in connection with FIG. 7 thereof for the two rotational axes of the rotating swivel unit shown herein in that a ball, which is mounted at a distance from the rotational axis $a_c$, is attached to the swivel joint 8 in lieu of the sensor 9 and the swivel joint is brought into a plurality of rotational positions. Then, for each of the rotational positions, the corresponding center point of the ball is measured and a compensating circle is best adapted from the measured ball center points. The rotational axis then results as a straight line perpendicular through the center point of the compensating circle. This has several disadvantages. For one, a corresponding ball must be separately attached to the swivel joint 8 in lieu of the sensor 9 for taking up these corrective values. Furthermore, the entire rotating swivel unit 13 must be mounted on a separate measuring apparatus on which the individual center points of the ball are determined for the individual rotational positions.

A considerable simplification therefore results when the position of the rotational axis $a_c$ is determined with the measuring sensor 9 itself in accordance with the invention. This will now be explained hereinafter in connection with FIGS. 4 and 5.

In accordance with the first calibration method, measuring points $p_o$ are to be taken up on the sphere at an adequate number of positions (i=1 . . . n) of the sensor measuring region for at least two rotational positions j=1 . . . m(m≥2) of the axis $a_c$ of the swivel joint 8. All these points must satisfy the basic equation:

$$|p_{o,j,i} - p_K| = r_K.$$

The sought-after parameters ($T_{BC}$, $d_S$, $M_S^*$, $d_C$) for the axis $a_c$ including of the sensor then result from the following equation which is to be solved. This equation is in this case very extensive and can be solved in a manner known per se, for example, by means of Newton-Raphson. This equation for least error squares is:

$$\sum_j \sum_i f_{j,i} = \sum_j \sum_i (|p_M - p_K +$$
$$T_A^{-1} R_A \{T_{AB}^{-1} R_S [T_{BC}^{-1} R_{C,j}(d_S +$$
$$M_S^* s'_{j,i}) + d_C] + d_B\}| - r_K)^2 \Rightarrow \text{Min.}$$

The second solution method is mathematically and numerically simpler. In this second solution method, in the first step, a calibration of the sensor 9 is carried out for at least two but preferably for three or more rotational positions of the swivel joint 8 or of the rotational axis $a_c$ which distribute preferably uniformly over the entire rotational range of the swivel joint 8. This calibration is carried out either as described above or as described in U.S. Pat. No. 5,778,548. In this calibration, the parameters of the sensor matrix $M_S$ are computed for each of the rotational positions and these parameters describe the transformation of the sensor coordinate system into the machine coordinate system and parameters of the vector $p_S$ are computed. The parameters of the vector $p_S$ describe the offset of the origin of the sensor coordinate system (u,v,w) relative to the point AB in the machine coordinate system. From the determined vectors $p_S$, a compensating circle could be determined already in accordance with the model of U.S. Pat. No. 4,888,877 and, from this, the position of the rotational axis $a_c$ can be determined. For the case that the sensor zero point lies very close to the rotational axis $a_c$, this would, however, lead to considerable uncertainties in view of the unavoidable measuring inaccuracies of the sensor 9. One would especially advantageously include additionally also the sensor matrix $M_S$ in the computation of the position of the axis $a_c$ because this sensor matrix defines the alignment of the sensor coordinate system. One could, for example, compute a compensating circle for two virtual measuring points (L, Q) in the sensor coordinate system (u,v,w) at the edge of the measuring field 20 for each of the three rotational positions and could lay a best adapted line through the corresponding center points of the three compensating circles which then defines the rotational axis $a_c$.

Still more accurately, the sought-after axial direction results from the previously determined sensor matrices in that, for two desired angle combinations from the participating sensor matrices ($M_{si}$ and $M_{sj}$) the corresponding rotation matrix ($R_{ij} = M_{si} M_{sj}^{-1}$) is formed and the axial vector is computed as inherent vector of the matrix $R_{ij}$. In the case of (m>2) rotational positions of the axis $a_c$, the corresponding rotation matrices $R_{ij}$ result from the (m(m−1)/2) possible two-combinations of sensor matrices. From the rotation matrices $R_{ij}$, the sought-after axial direction vector can be computed as a mean inherent vector in accordance with a known square means method (for example, Householder).

Figure 5:
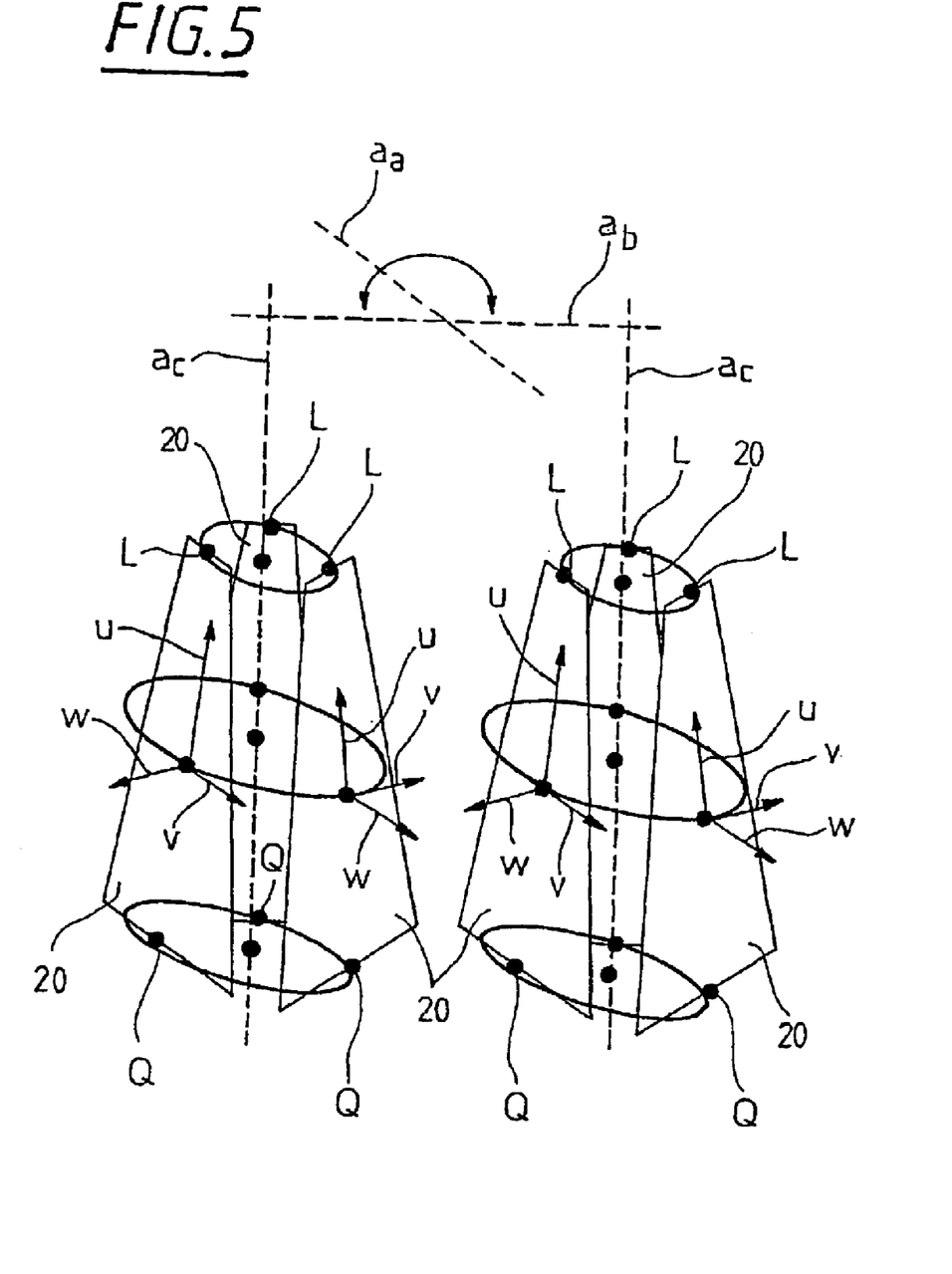

For taking up the corrective values, it is especially advantageous to bring the swivel joints (6, 7) into a position so that the swivel joint 8 bends as little as possible. In this special embodiment, this is then the case when the rotational axis $a_b$ is aligned horizontally and the rotational axis $a_c$ is aligned vertically as shown in FIG. 5. Additionally, it is especially advantageous when the swivel joint 6 with the horizontally-aligned rotational axis $a_a$ is brought into position with the position being rotated by 180° and, in this position, renewed calibrations are undertaken as just described in the at least two rotational positions of the swivel joint 8.

Although this is completely clear, it is however mentioned for the sake of completeness that the above three rotational positions are displaced each by 120° in a rotational range of the swivel joint 8 of 360°.

After the position of the rotational axis $a_c$ is computed, the points (BC and CB) and therefore also the vectors ($d_C$ and $d_S$) are computed. Furthermore, the sensor matrix ($M_S$ or $M_S^*$) is known from the calibration. Furthermore, the parameters of the transformation matrix $T_{BC}^{-1}$ can be computed via a numerical computation method such as the method of least error squares according to Gauss utilizing the measured values recorded in the calibration.

In this way, all unknown parameters are available with which the position of the rotational axes can be corrected.

In addition to the correction of the position of the rotational axes, it can also be purposeful to correct angular position deviations and/or course deviations in the rotational axes. The correction can take place in the same manner as described in U.S. Pat. No. 4,888,877 in connection with FIG. 8 in that a plate having four balls is attached to the swivel joint 8 in lieu of the sensor 9 and the plate is rotated via the swivel joint 8 into a plurality of rotational positions. For each of the balls, the center point is measured and corrective parameters for angle position deviations and/or course deviations in the swivel joints are determined in accordance with the method for measuring rotation table deviations known from U.S. Pat. No. 4,819,339.

In lieu of a ball plate, the sensor 9, however, can be used. The swivel joint 8 is rotated into a plurality of rotational positions and, for each rotational position, a calibration is carried out in the manner described above. The sensor matrix $M_S$, as described above, defines the alignment of the sensor coordinate system (u,v,w). For this reason, in lieu of the four center points of the balls on the plate, four virtual points could be used which are, for example, located at the corners of the measuring field 20 so that the corrective values can be computed completely in the same manner via the method shown in U.S. Pat. No. 4,819,339.

The sensor 9 in the last mentioned method must measure at least in two dimensions.

The above-described methods are usually carried out in the control and evaluation unit 23. Alternatively, a separate microprocessor could be provided wherein the computations are made.

The international patent application PCT/EP 01/10066, filed Aug. 31, 2001, on which this present application is based, is incorporated herein by reference.

It is understood that the foregoing description is that of the preferred embodiments of the invention and that various changes and modifications may be made thereto without departing from the spirit and scope of the invention as defined in the appended claims.

What is claimed is:

1. A method for determining corrective parameters of a rotating swivel unit to which a sensor of a coordinating measuring apparatus is attached with said sensor measuring in at least one dimension, the rotating swivel unit having a swivel joint and the method comprising the steps of:

carrying out a calibration of said sensor for at least three rotational positions of said swivel joint;

computing at least parameters of a first parameter field ($M_S$) for each of said rotational positions with said first parameter field ($M_S$) describing the transformation of a sensor coordinate system (u,v,w) into a machine coordinate system ($X_M$, $Y_M$, $Z_M$) of the coordinate measuring apparatus;

computing parameters of a second parameter field ($p_s$) describing an offset of said sensor coordinate system (u,v,w) with respect to a point (AB) in said machine coordinate system ($X_M$, $Y_M$, $Z_M$); and, determining corrective parameters of said swivel joint from said parameters of said first and second parameter fields.

2. The method of claim 1, wherein said corrective parameters include at least one of the following: position of the rotational axes to each other, angular position deviations and course deviations.

3. The method of claim 1, wherein a rotational axis ($a_a$) of said swivel joint is vertically aligned during the calibration of said sensor.

4. The method of claim 1, wherein measurement values are measured during the calibration which are substantially uniformly distributed over the measuring range of said sensor.

5. The method of claim 1, wherein said sensor is connected directly to said swivel joint and the corrective parameters are determined only for said swivel joint.

6. The method of claim 1, comprising the further steps of:

providing a calibration sphere having a known radius ($r_K$) in the measuring space of said coordinate measuring apparatus and determining the center point ($p_K$) of said calibration sphere in said machine coordinate system ($X_M$, $Y_M$, $Z_M$);

measuring points ($p_{o,i}$) on the surface of said calibration sphere utilizing said sensor to be calibrated;

recording measured values ($s'_i$) over wide regions of said measuring ranges; and, determining said parameters of said first parameter field ($M_S$) and said second parameter field ($p_S$) for said sensor from said measured values ($s'_i$) while considering that said center point ($p_K$) and said radius ($r_K$) of said calibration sphere are known.

7. The method of claim 6, comprising the further step of determining the parameters of said parameter fields ($M_S$, $p_S$) while using the following relationship:

$$|p_{o,i} - p_K| = r_K$$

wherein:

$p_{o,i}$ is a measuring point on the surface of the calibration sphere;

$p_K$ is the center point of the calibration sphere;

$r_K$ is the radius of the calibration sphere; and, wherein, in the relationship, the center point ($p_K$) of the calibration sphere and the radius of the calibration sphere are known.

8. The method of claim 7, wherein the parameters of said parameter fields ($M_S$, $p_S$) are determined via the following relationship:

$$|p_M + p_S + M_S s' - p_K| = r_K$$

wherein:

$p_K$ is a vector to the center point of the calibration sphere in said machine coordinate system;

$r_K$ is the radius of said calibration sphere;

$p_M$ is a vector from the origin of the machine coordinate system ($X_M$, $Y_M$, $Z_M$) to said point (AB) in the measuring arm of said coordinate measuring apparatus with said sensor being attached to said measuring arm;

$p_S$ is a vector from point (AB) in said measuring arm to said origin of said sensor coordinate system (u,v,w);

s' is a vector of a measuring point on the surface of said calibration sphere with said measuring point being measured in said sensor coordinate system (u,v,w); and, $M_S$ is said first parameter field (sensor matrix).

9. A rotating swivel unit for a sensor of coordinate measuring apparatus, the sensor measuring in at least one dimension and the rotating swivel unit comprising:

at least two swivel joints for aligning the sensor with respect to angle;

a corrective unit for correcting the measured values of the sensor, when measuring, in correspondence to the rotational position of said swivel joints;

means for picking up corrective values which include functioning to:

carry out a calibration of said sensor for at least three rotational positions of one of said swivel joints with said sensor measuring in at least one dimension;

compute at least parameters of a first parameter field ($M_S$) for each of said rotational positions with said first parameter field ($M_S$) describing the transformation of a sensor coordinate system (u,v,w) into a machine coordinate system ($X_M$, $Y_M$, $Z_M$) of the coordinate measuring apparatus;

compute parameters of a second parameter field ($p_S$) describing an offset of said sensor coordinate system (u,v,w) with respect to a point (AB) in said machine coordinate system ($X_M$, $Y_M$, $Z_M$); and, determine corrective parameters of said swivel joint from said parameters of said first and second parameter fields.

10. The rotating swivel unit of claim 9, wherein said corrective parameters include at least one of the following: position of the rotational axes to each other, angular position deviations and course deviations.

11. The rotating swivel unit of claim 9, wherein a rotational axis ($a_a$) of said swivel joint is vertically aligned during the calibration of said sensor.

12. The rotating swivel unit of claim 9, wherein measurement values are measured during the calibration which are substantially uniformly distributed over the measuring range of said sensor.

13. The rotating swivel unit of claim 9, wherein said sensor is a two-dimensional measuring optical probe.

14. The rotating swivel unit of claim 9, wherein the pick up of corrective parameters for different angular positions of the swivel joints is carried out.

15. The rotating swivel unit of claim 9, wherein said three rotational positions of said swivel joint are distributed substantially uniformly over the rotational range of said swivel joint.

16. The rotating swivel unit of claim 9, wherein said corrective unit functions to carry out the calibration of said sensor by performing the method steps of:

providing a calibration sphere having a known radius ($r_K$);

determining the center point ($p_K$) of a calibration sphere in said machine coordinate system ($X_M$, $Y_M$, $Z_M$);

measuring points ($p_{o,i}$) on the surface of said calibration sphere utilizing said sensor to be calibrated;

recording measured values ($s'_i$) over wide regions of said measuring ranges; and, determining said parameters of said first parameter field ($M_S$) and said second parameter field ($p_S$) for said sensor from said measured values ($s'_i$) while considering that said center point ($p_K$) and said radius ($r_K$) of said calibration sphere are known.

17. The rotating swivel unit of claim 16, wherein the corrective unit determines the parameters of said parameter field ($M_S$) while using the following relationship:

$$|p_{o,i} - p_K| = r_K$$

wherein:

$p_{o,i}$ is a measuring point on the surface of the calibration sphere;

$p_K$ is the center point of the calibration sphere;

$r_K$ is the radius of the calibration sphere; and, wherein, in the relationship, the center point ($p_K$) of the calibration sphere and the radius of the calibration sphere are known.

18. The rotating swivel unit of claim 17, wherein the corrective unit determines the parameters of said parameter field ($M_S$) via the following relationship:

$$|p_M + p_S + M_S s' - p_K| = r_K$$

wherein:

$p_K$ is a vector to the center point of the calibration sphere in said machine coordinate system;

$r_K$ is the radius of said calibration sphere;

$p_M$ is a vector from the origin of the machine coordinate system ($X_M$, $Y_M$, $Z_M$) to said point (AB) in the measuring arm of said coordinate measuring apparatus with said sensor being attached to said measuring arm;

$p_S$ is a vector from point (AB) in said measuring arm to said origin of said sensor coordinate system (u,v,w);

s' is a vector of a measuring point on the surface of said calibration sphere with said measuring point being measured in said sensor coordinate system (u,v,w); and, $M_S$ is said first parameter field (sensor matrix).

19. The rotating swivel unit of claim 9, wherein said sensor is attached to said rotating swivel unit so as to be exchangeable.

* * * * *

UNITED STATES PATENT AND TRADEMARK OFFICE
CERTIFICATE OF CORRECTION

PATENT NO.   : 6,854,193 B2
DATED        : February 15, 2005
INVENTOR(S)  : Werner Lotze It is certified that error appears in the above-identified patent and that said Letters Patent is hereby corrected as shown below:

Column 2,
Line 43, delete "coodinating" and substitute -- coordinate -- therefor.

Figure 2:
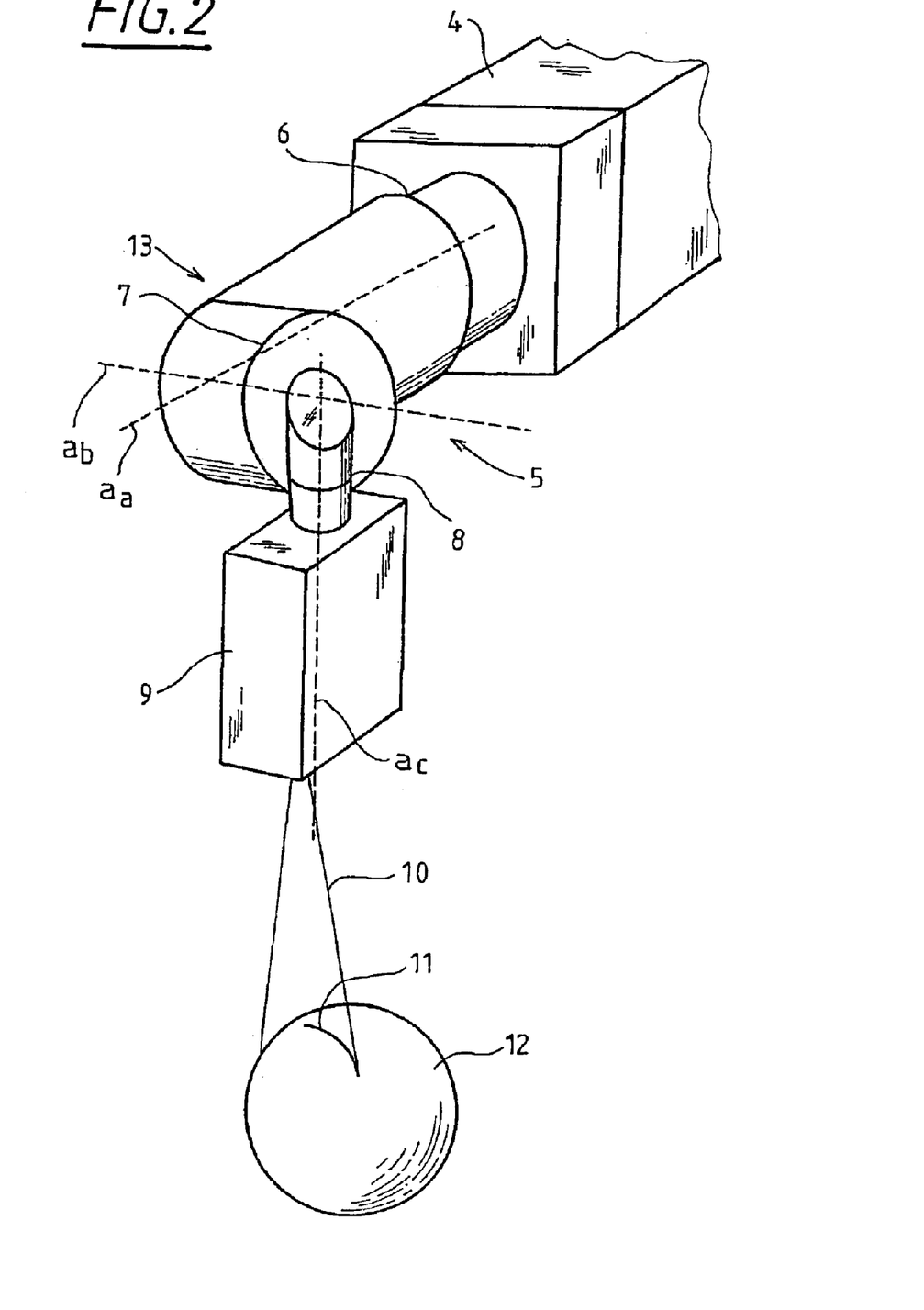
FIG. 2 is a perspective schematic of an optical sensor 9 of FIG. 1 shown scanning a calibration sphere 12.
Figure 3:
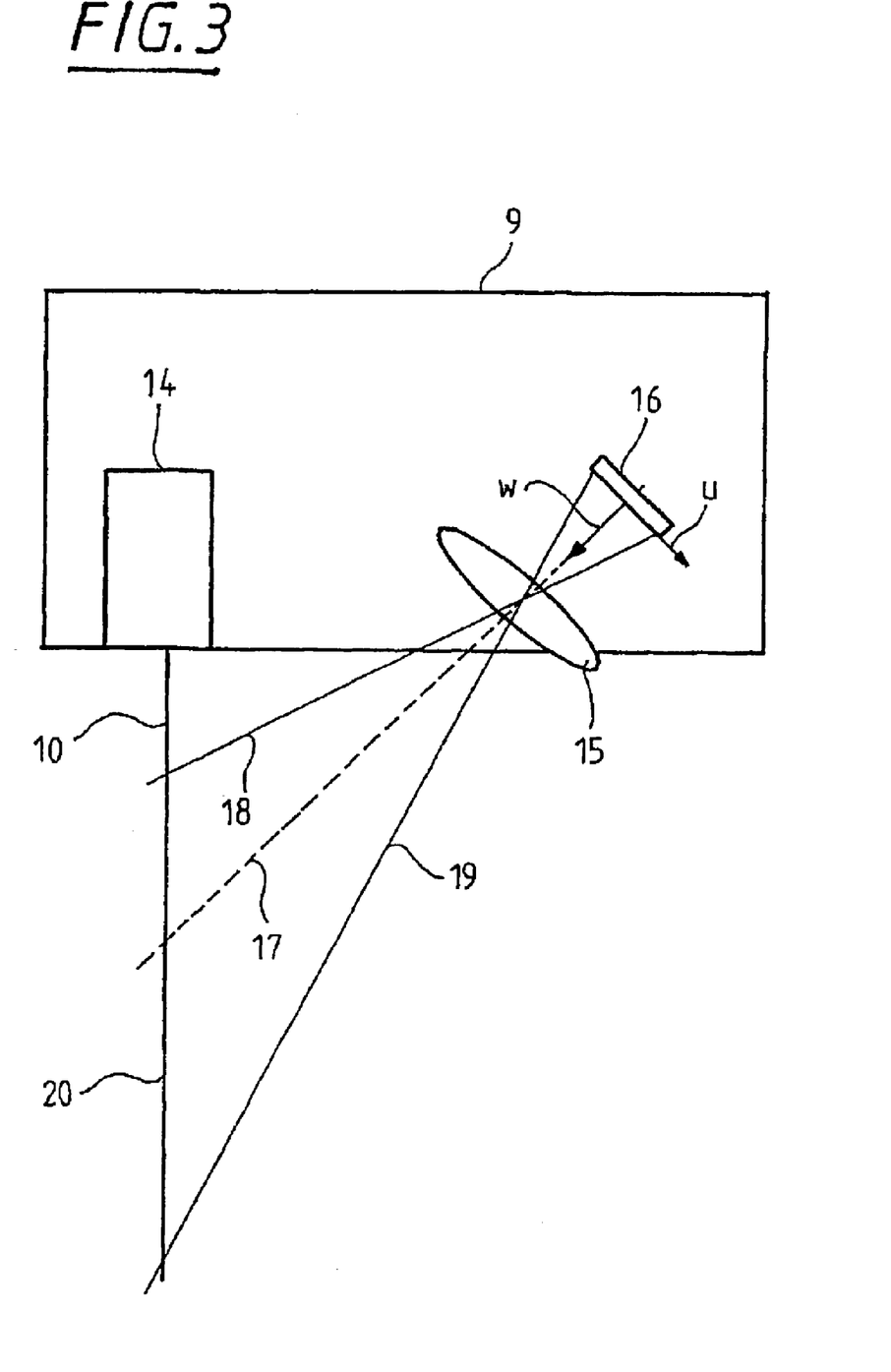
FIG. 3 is a side elevation schematic of the optical sensor 9 of FIG. 1.

Column 5,
Line 51, delete "FIG. 2," and substitute -- FIG. 2. -- therefor.
Line 59, delete "FIG. 2" and substitute -- FIG. 2, -- therefor.

Column 8,
Line 17, delete "$p_s=p_M+\{T_A^{-1}R_A[T_{AB}^{-1}R_B(T_{BC}^{-1}R_C(d_S+M^*_s s')+d_c)+]d_B\}$" and substitute
-- $p_s=p_M+\{T_A^{-1}R_A[T_{AB}^{-1}R_B(T_{BC}^{-1}R_C(d_S+M^*_s s')+d_c)]+d_B\}$ -- therefor.
Line 33, insert -- axis -- after "rotational".

Column 9,
Line 17, delete "$M_S=T_A^{-1}R_A*T_M^{-1}R_C*T_K^{-1}R_c\ *M_S$" and substitute
-- $M_S=T_A^{-1}R_A*T_{AB}^{-1}R_B*T_{BC}^{-1}R_c\ *M_S*$ -- therefor.

Column 11,
Line 62, delete "coordinating" and substitute -- coordinate -- therefor.

Signed and Sealed this

Tenth Day of May, 2005

JON W. DUDAS
*Director of the United States Patent and Trademark Office*